(12) United States Patent
Ayakannu

(10) Patent No.: US 12,290,031 B2
(45) Date of Patent: May 6, 2025

(54) SYSTEM AND METHOD FOR PROPAGATING, TRANSPORTING, AND GROWING FREE-ROOTED PLANTS

(71) Applicant: Keerti Ayakannu, Santa Cruz, CA (US)

(72) Inventor: Keerti Ayakannu, Santa Cruz, CA (US)

( * ) Notice: Subject to any disclaimer, the term of this patent is extended or adjusted under 35 U.S.C. 154(b) by 0 days.

(21) Appl. No.: 17/548,343

(22) Filed: Dec. 10, 2021

(65) Prior Publication Data

US 2022/0201952 A1  Jun. 30, 2022

Related U.S. Application Data

(60) Provisional application No. 63/124,007, filed on Dec. 10, 2020.

(51) Int. Cl.
*A01G 31/02* (2006.01)
*A01G 7/04* (2006.01)
(Continued)

(52) U.S. Cl.
CPC ............ *A01G 31/02* (2013.01); *A01G 7/045* (2013.01); *A01G 29/00* (2013.01); *B65B 5/04* (2013.01);
(Continued)

(58) Field of Classification Search
CPC ...... A01G 31/02; A01G 9/143; A01G 9/0299; B65D 85/50; B65D 85/505;
(Continued)

(56) References Cited

U.S. PATENT DOCUMENTS 4,332,105 A * 6/1982 Nir .................. A01G 31/02
239/69
4,584,791 A * 4/1986 Wolf ................ A01G 31/02
47/79
(Continued)

FOREIGN PATENT DOCUMENTS

CN      210352537 U   *  4/2020

OTHER PUBLICATIONS

Murashige, T. and Skoog, F. (1962), A Revised Medium for Rapid Growth and Bio Assays with Tobacco Tissue Cultures. Physiologia Plantarum, 15: 473-497. https://doi.org/10.1111/j.1399-3054.1962.tb08052.x (Year: 1962).*

*Primary Examiner* — Joshua D Huson
*Assistant Examiner* — Brook Victoria Schmid
(74) *Attorney, Agent, or Firm* — Michael A. Guth

(57) ABSTRACT

A system for the transport and growing of free-rooted plants adapted to be grown aeroponically. The system and method includes propagating the free-rooted plants and then transferring them to a transport container. The transport container includes a light and hydrated nutrient balls adapted to keep the plant alive during transport. The plant may, after transport, be transferred to a growing container. The growing container may include a spherical upper portion and a conical lower portion. The growing container allows for the growing of individual free-rooted plants and is coupled to a fluid supply system which provides water to misters within the growing container, and which removes excess water from the bottom of the lower portion of the growing container.

15 Claims, 16 Drawing Sheets

(51) Int. Cl.
*A01G 29/00* (2006.01)
*B65B 5/04* (2006.01)
*B65B 25/02* (2006.01)
*B65D 81/05* (2006.01)
*B65D 81/22* (2006.01)
*B65D 85/52* (2006.01)

(52) U.S. Cl.
CPC .............. *B65B 25/02* (2013.01); *B65D 81/05* (2013.01); *B65D 81/22* (2013.01); *B65D 85/52* (2013.01)

(58) Field of Classification Search
CPC .... B65D 85/5035; B65D 85/52; B65B 25/02; B65B 25/023; B65B 25/026
See application file for complete search history.

(56) References Cited

U.S. PATENT DOCUMENTS

| | | | | |
|---|---|---|---|---|
| 5,385,589 | A * | 1/1995 | Kratky | A01G 31/02 47/64 |
| 10,716,265 | B2 * | 7/2020 | Alexander | B65H 29/12 |
| 11,197,435 | B2 * | 12/2021 | Cademartiri | C08L 5/04 |
| 11,503,783 | B2 * | 11/2022 | Craig | A01G 27/008 |
| 11,582,926 | B2 * | 2/2023 | Mata | A01G 27/005 |
| 2007/0266629 | A1 | 11/2007 | Bradley | |
| 2015/0282444 | A1 * | 10/2015 | Butler | A01G 31/06 47/62 C |
| 2018/0368345 | A1 * | 12/2018 | Kariv | A01G 31/02 |
| 2019/0297801 | A1 | 10/2019 | Nguyen et al. | |
| 2019/0327907 | A1 * | 10/2019 | Ostman | A01G 9/249 |

* cited by examiner

SYSTEM AND METHOD FOR PROPAGATING, TRANSPORTING, AND GROWING FREE-ROOTED PLANTS

CROSS-REFERENCE TO RELATED APPLICATIONS

This application claims priority to U.S. Provisional Patent Application No. 63/124,007 to Ayakannu, filed Dec. 10, 2020, which is hereby incorporated by reference in its entirety.

BACKGROUND

Field of the Invention

This invention relates to a system and method for growing free-rooted plants, namely for propagating, transporting, and growing free-rooted plants.

Description of Related Art

Hydroponic technology attempts to address shortcomings of soil-related farming by removing the soil from the growing method. Plants are grown in containers with a circulated nutrient solution. Dissolved oxygen is one of the critical nutrients. A reservoir is the component of the hydroponic system that holds the nutrient solution. Water is delivered to the individual plants, which absorb the water and nutrients that they need, and leave the rest in the growing medium. This may cause a buildup of salts in the growing medium or the reservoir, so flushing may be needed.

Aeroponics is a system which uses little or no growing media. Typically, the plants are suspended with the roots inside a growing chamber. The plants may then get sprayed with nutrient solution with a fine mist at regular short cycles. Prior systems have been adapted to support a large number of plants grown together.

What is called for is a system and method for growing individual free-rooted plants. What is also called for is a growing container that allows for the growing of free-rooted plants while providing water and nutrients, and removing excess water.

SUMMARY

A system for the transport and growing of free-rooted plants adapted to be grown aeroponically. The system and method includes propagating the free-rooted plants and then transferring them to a transport container. The transport container includes a light and hydrated nutrient balls adapted to keep the plant alive during transport. The plant may, after transport, be transferred to a growing container. The growing container may include a spherical upper portion and a conical lower portion. The growing container allows for the growing of individual free-rooted plants and is coupled to a fluid supply system which provides water to misters within the growing container, and which removes excess water from the bottom of the lower portion of the growing container.

DETAILED DESCRIPTION

Figure 1A:
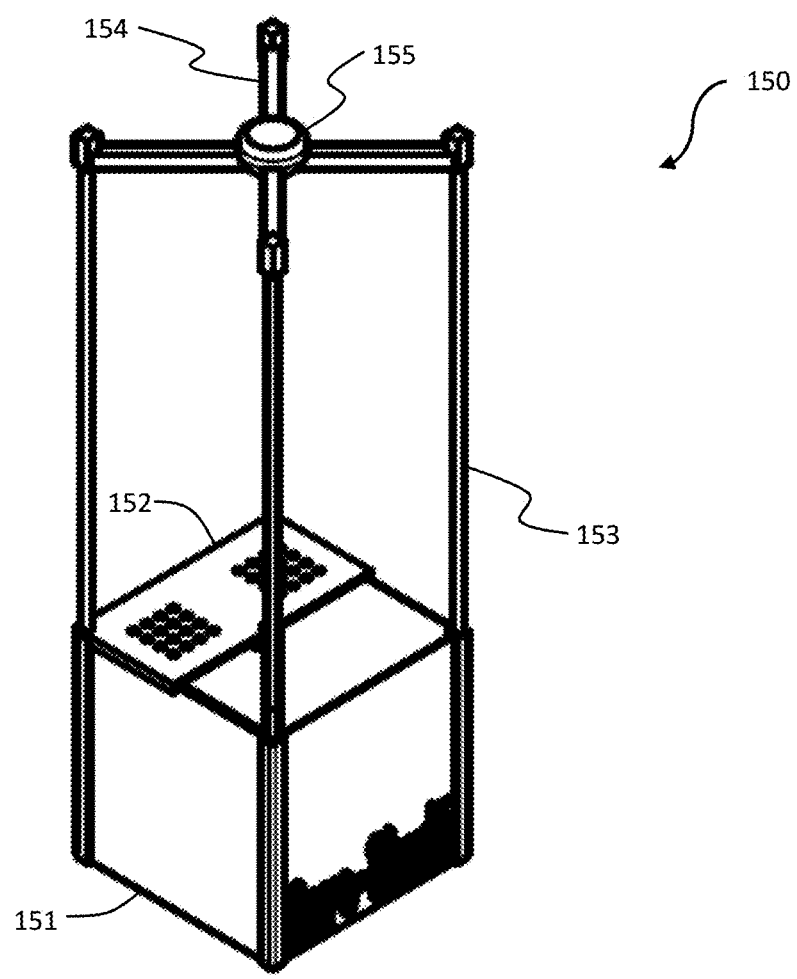
FIG. 1A is an oblique view of a transport container according to some embodiments of the present invention.

In some embodiments of the present invention, as seen in FIGS. 1A through 1D, a transport container for free-rooted plants 150 includes a base container 151. The base container 151 is adapted to support pillars 153 which extend upwards from the base container 151. A top 154 resides at the upper end of the transport container 150 and is supported by the pillars 153. The top 154 provides support for a light 155 which is adapted to provide light downwards towards a plant which may be held by the base container. In some aspects, the pillars are adapted to be inserted into receptacle holes in the base container 151 and the top 154. In some aspects, the height of the base container is 60% of the length of the pillars above the base container. In aspects, the height of the base container is in the range of 50-70% of the length of the pillars above the base container. In an exemplary embodiment, the height of the base container 151 is 40% of the height of the transport container 150.

In an exemplary embodiment, the container base size is 3 inches by 3 inches. This container size may provide plants for growing containers with a spherical diameter of 9 inches, which are discussed below. In other aspects, the container base size may be 4 inches by 4 inches, or 6 inches by 6 inches, although other larger sizes are envisioned.

Figure 1B:
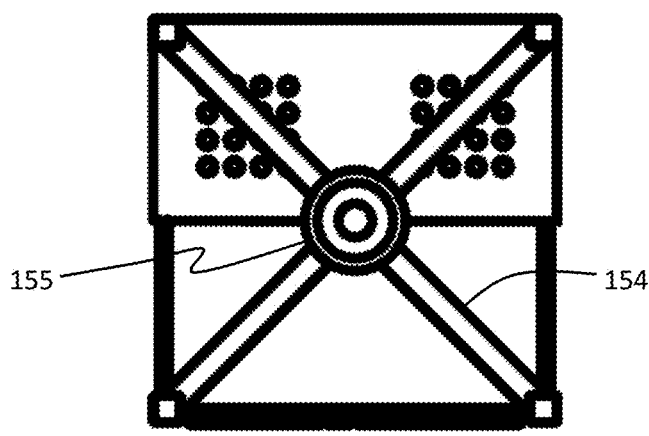
FIG. 1B is a top view of a transport container according to some embodiments of the present invention.
Figure 1C:
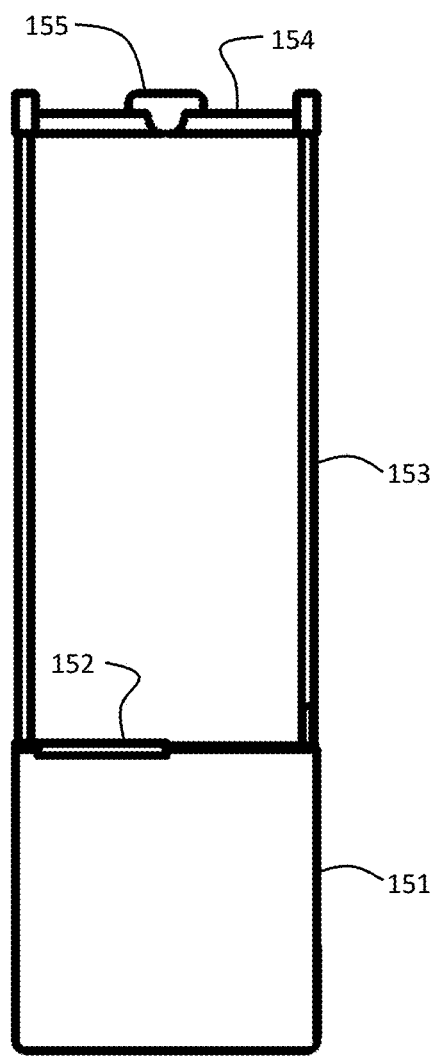
FIG. 1C is a side view of a transport container according to some embodiments of the present invention.

A stem and root stabilizer 152 may consist of a first portion and a second portion (first portion only is shown in FIGS. 1A-C). The stem and root stabilizer is adapted to support the plant above the roots and along the lower stem through a center hole. The stem and root stabilizer 152 is adapted to removably attach to the top of the base container 151.

Figure 2A:
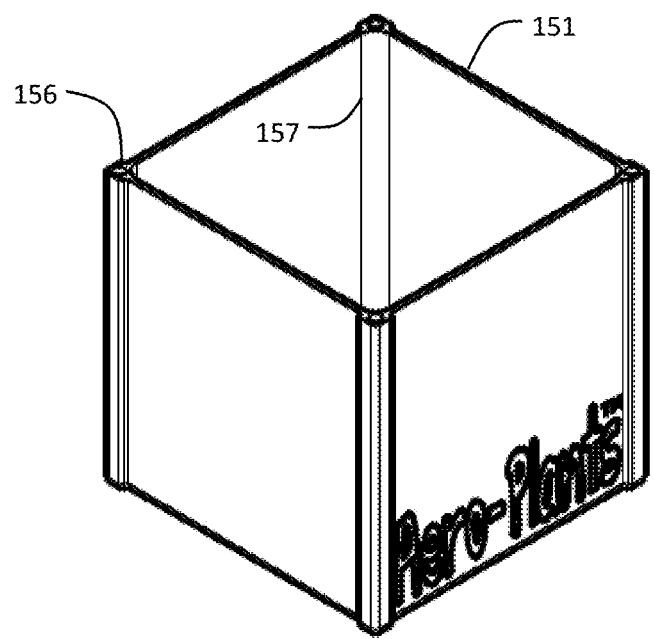
FIG. 2A is an oblique view of a container base according to some embodiments of the present invention.
Figure 2B:
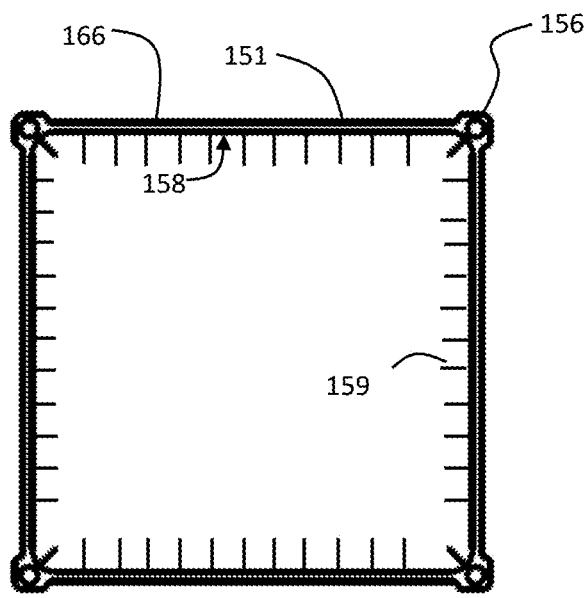
FIG. 2B is a top view of a container base according to some embodiments of the present invention.

FIGS. 2A-B illustrate the base container 151 according to some embodiments of the present invention. In this exemplary embodiment, the base container 151 is a square box. In some aspects, the base container 151 has four corners, each with a coupling location 156 for coupling of the pillars 153 to the corners of the base container 151. In some aspects, the coupling location 156 comprises a hole adapted to receive a lower end of a pillar 153. In some aspects, the outer surfaces of the base container 151 may have recesses 166 adapted to receive a portion of the stem and root stabilizer 152 such that the stem and root stabilizer 152 does not protrude further outward than the corners of the base container 151. This may reduce the likelihood that the stem and root stabilizer 152 be unintentionally decoupled from the top of the base container 151.

In some aspects, the base container has rounded interior corners 159 adapted to work in conjunction with hydrated balls, which will be discussed below. The rounded interiors may be seen at the junction of the inner side surfaces 158 with each other, and with the bottom of the base container. When used with hydrated balls, the ratio of the radius of the rounded interior corners to the radius of the hydrated balls is geared to enhance the movement of the hydrated balls and to reduce any stagnation. In some aspects, the radius of the rounded interior corners is 60% of the radius of the hydrated nutrient balls. In some aspects, the ratio of the radius of the rounded interior corners to the radius of the hydrated balls is in the range of 0.5 to 0.7.

Figure 3A:
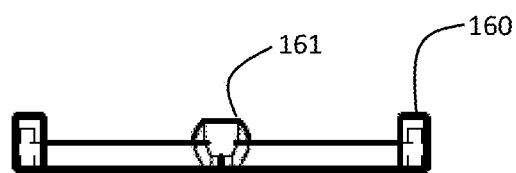
FIG. 3A is a side view of a container top according to some embodiments of the present invention.
Figure 3B:
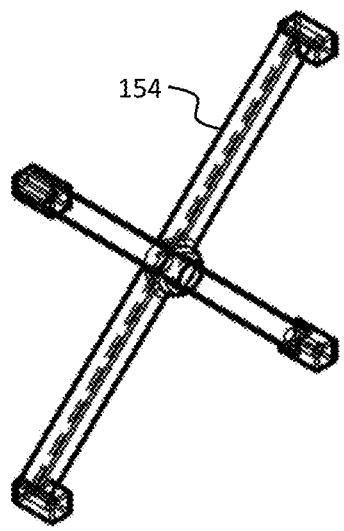
FIG. 3B is an oblique view of a container top according to another embodiment of the present invention.
Figure 3C:
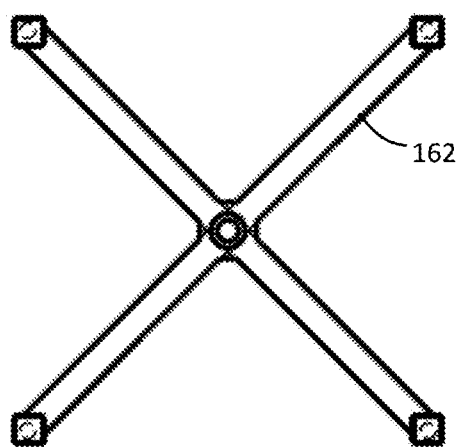
FIG. 3C is a top view of a container top according to another embodiment of the present invention.
Figure 4A:
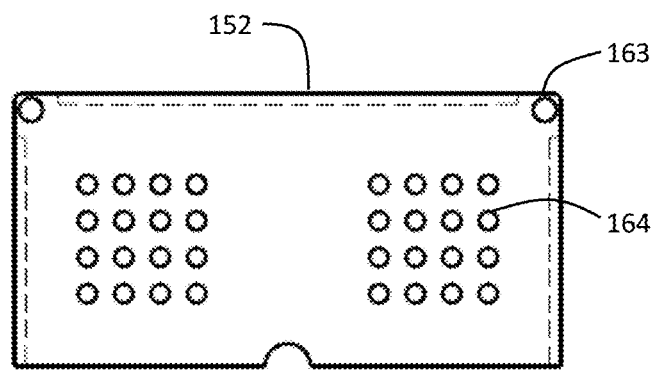
FIG. 4A is a top view of a stem and root stabilizer according to some embodiments of the present invention.
Figure 4B:
FIG. 4B is a side view of a stem and root stabilizer according to some embodiments of the present invention.
Figure 4C:
FIG. 4C is an end view of a stem and root stabilizer according to some embodiments of the present invention.
Figure 4D:
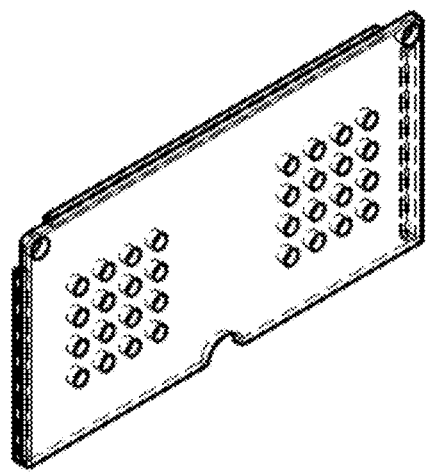
FIG. 4D is an oblique view of a stem and root stabilizer according to some embodiments of the present invention.

FIGS. 3A-C illustrate the top 154 according to some embodiments of the present invention. In this illustrative example, the top 154 is adapted to be supported by the pillars 153. The pillars 153 may be inserted into holes 160 at each of the four corners of the top 154. Cross braces 162 are coupled to the pillars 153 and provide an interface 161 for the light at their crossing point.

The light 155 may include a battery adapted to power the light for up to 14 days, for example. The light may include a switch adapted to energize the light. In some aspects, the light contains an LED, which may be optimized in its wavelength to promote photosynthesis. The wavelength of the LED may be in the range of 400-600 nm, preferably in the range of 400-500 nm. In some aspects, the light from the LED refracts through the cross braces 162 and provides further light from above the plant which will reside in the transport container.

FIGS. 4A-D illustrate a stem and root stabilizer portion 152 according to some of the embodiments of the present invention. The stem and root stabilizer portion 152 is adapted to couple to the upper rim of the base container 151 while stabilizing and supporting the plant at the stem and root hole 165. The tabs 167 are adapted to reside in the recesses 166 of the base container 151. A first stem and root stabilizer portion and a second root and stabilizer portion are adapted to be used together to capture and stabilize a free-rooted plant and to be removably coupled to the base container. Holes 163 are adapted to allow the stem and root stabilizer portion to be captured between the pillars 153 and the holes 156 in the base container 151. With the pillars placed into the holes 156 with a frictional fit, or other releasable fit, the pillars may be used to fixedly capture the stem and root portions in place with the plant captured and stabilized.

Figure 5:
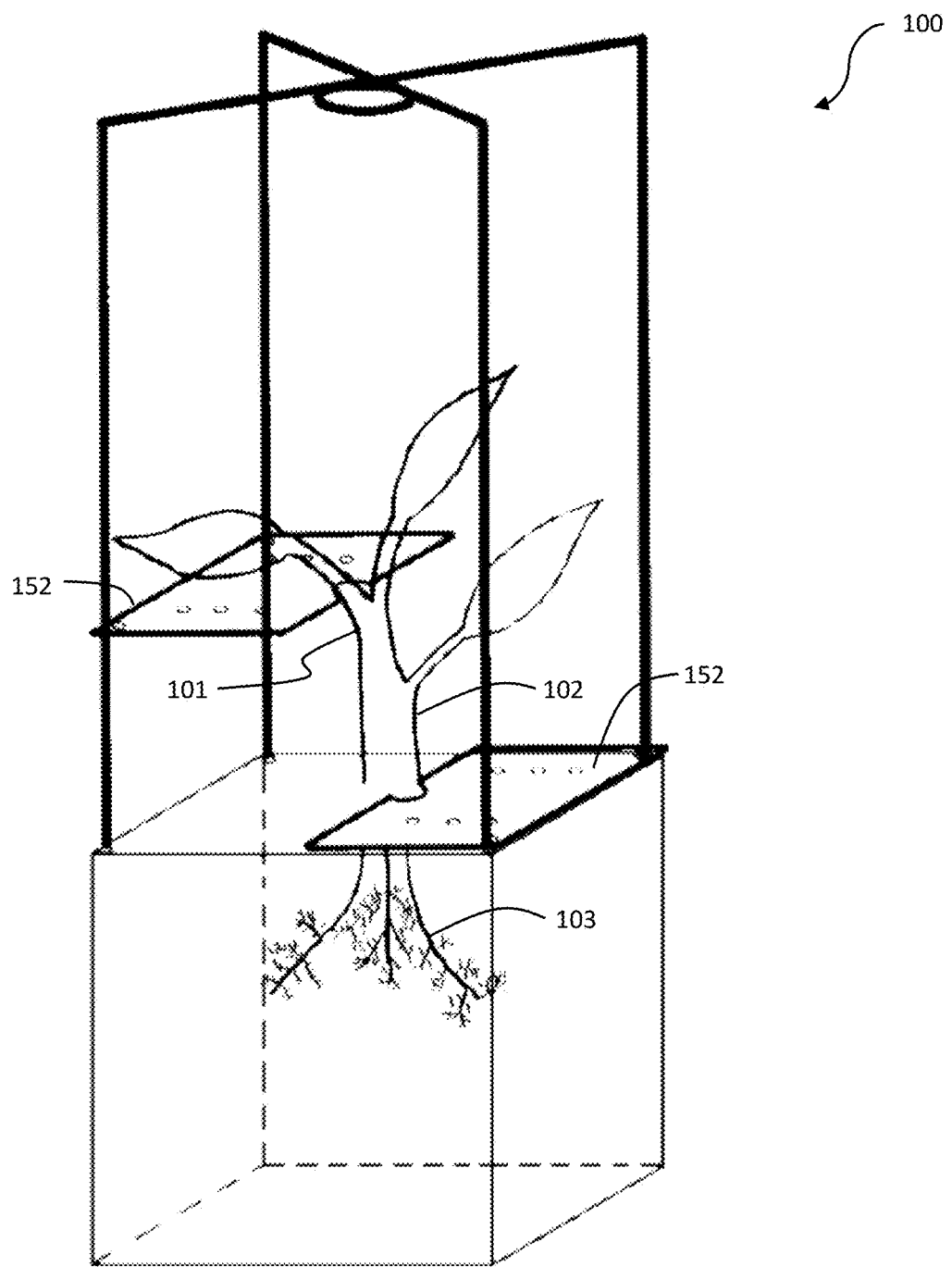
FIG. 5 is a view of a transport container with plant according to some embodiments of the present invention.

FIG. 5 illustrates a transport container for free-rooted plants assembly with a plant 100 according to some embodiments of the present invention. In this illustrative embodiment, the plant 101 has been placed within a transport container for free-rooted plants 150. The plant stem 102 is placed within the hole 163 of the stem and root stabilizer portions 152 (one is which is shown elevated and not in the final transport position). The roots 103 are suspended below the stem and root stabilizer 152 and substantially within the framing of the pillars 153. The plant is below the light 155 supported by the top 154, allowing the plant to be illuminated by the light during transport, even when the transport container for free-rooted plants 150 is contained within a shipping box, for example. Although illustrated in FIG. 5 with a portion of the root stabilizer elevated, it is to be understood that in assembled form the elevated portion would reside in line with the lowered portion.

In order to provide water and nutrition to the plant when in the transport container for free-rooted plants 150, hydratable balls are used. In some aspects, the hydratable balls are adapted to provide water, oxygen, and nutrients to the plant. With the use of hydrated nutrient balls a plant in the transport container for free-rooted plants may be shipped and be expected to survive for up to 14 days. In a typical case, the plant may be in the transport container for 3-10 days. In some aspects, the plant may continue to reside in the transport container for up to two months, in natural light. In such a circumstance, the plant may incubate as opposed to grow. In some aspects, the hydratable nutrient balls may need to be rehydrated in order for the plant to remain in the transport container.

Figure 6:
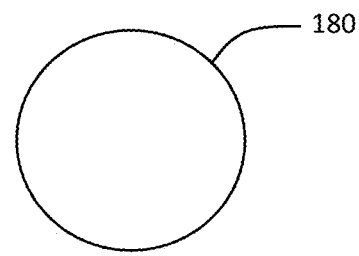
FIG. 6 is an illustration of a nutrient ball according to some embodiments of the present invention.
Figure 7:
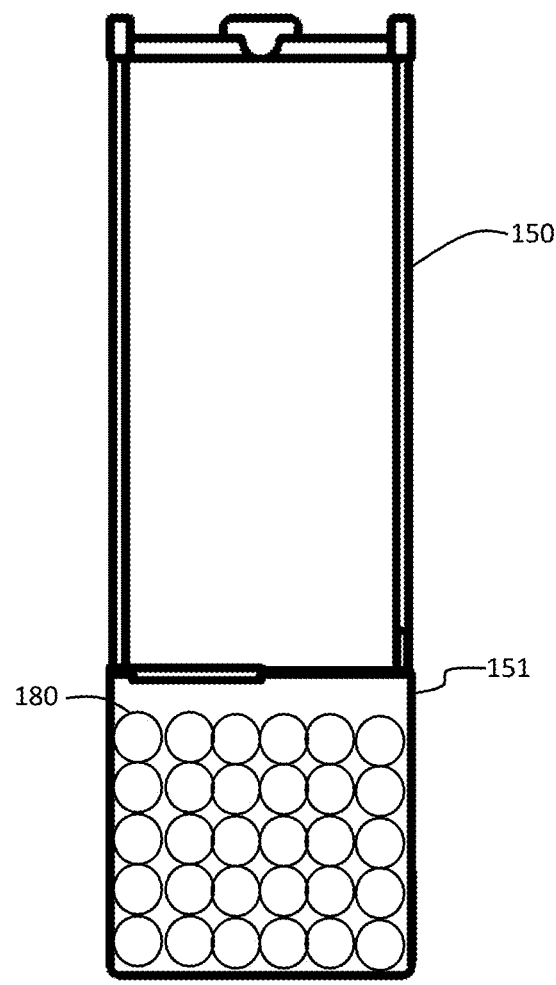
FIG. 7 is a view of a transport container with nutrient balls therein.

In some aspects, as seen in FIG. 6, the hydratable balls 180 may be made using tapioca. In some aspects, the hydratable balls may be made using gelatin. In either case, the base material is fashioned into a dough. The dough may then be rolled into 5 mm cylindrical sticks, and then cut into 2-3 mm pieces. These pieces may then be rolled into balls. The balls are then boiled in water for approximately 15 minutes. Prior to placing the balls in the boiling water, nutrients may be added to the water. The nutrients may include some or all of the following: nitrogen, phosphorous, potassium, calcium, magnesium, simple carbohydrates, rhizome, and mycorrhiza. These balls may then have oxygen added by placing them in water in a sealed container and may be oxygenated with the use of air stones, or other methods. These hydrated, completed, balls may then be used within the base container of the transport system to provide oxygen, moisture, and nutrients to a plant in the transport system. In some aspects, the hydrated nutrient balls may be in the range of ¾" to ½" in diameter. Although illustrated in FIG. 6 as round, it is to be understood that the hydrated balls may be a bit lumpy in appearance. FIG. 7 illustrates a transport container 150 where nutrient balls 180 are seen mostly filling the base container 151. In some aspects, the base container is filled with nutrient balls to fill 90-95% of the volume of the base container. In some aspects, the base container is filled with nutrient balls to fill greater than 70% of the volume of the base container. With larger transport containers, the nutrient balls may stay the same size. It is to be understood that the nutrient balls may be somewhat larger when fully hydrated, and somewhat smaller as they lose moisture.

In an exemplary embodiment, a method of transporting a free-rooted plant may include placing an aero-plant into the base container. Hydrated nutrient balls are then added into the base container. The stem and root stabilizer portions are then fitted around the stem of the plant above the roots, and the stem and root stabilizer portions are fitted to the top of the base container. The stem and root stabilizer portions may be fastened together, such as with adhesive tape. The pillars are then placed into the holes in the base container. The top is then coupled to the top of the pillars. At this point, the plant is nearly ready for shipment. The transport system may be placed into a shipping box, which may be rectangular and adapted to tightly enclose the transport system. The light is then switched on and the shipping box is then sealed. Finally, the plant is ready for shipping.

The transport system for free-rooted plants allows for free-rooted plants adapted for aeroponic growing to be shipped to end users who may then continue to grow the plant aeroponically. In some aspects, plants may be cloned and begin their growth cycle at a supplier location. Once removed from the clone starting system, plants may be sent singly to end users using delivery such as the postal service, for example. The recipient of the plant may then transfer the free-rooted plant to a growing system, such as a growing pod for a single plant.

Figure 8:
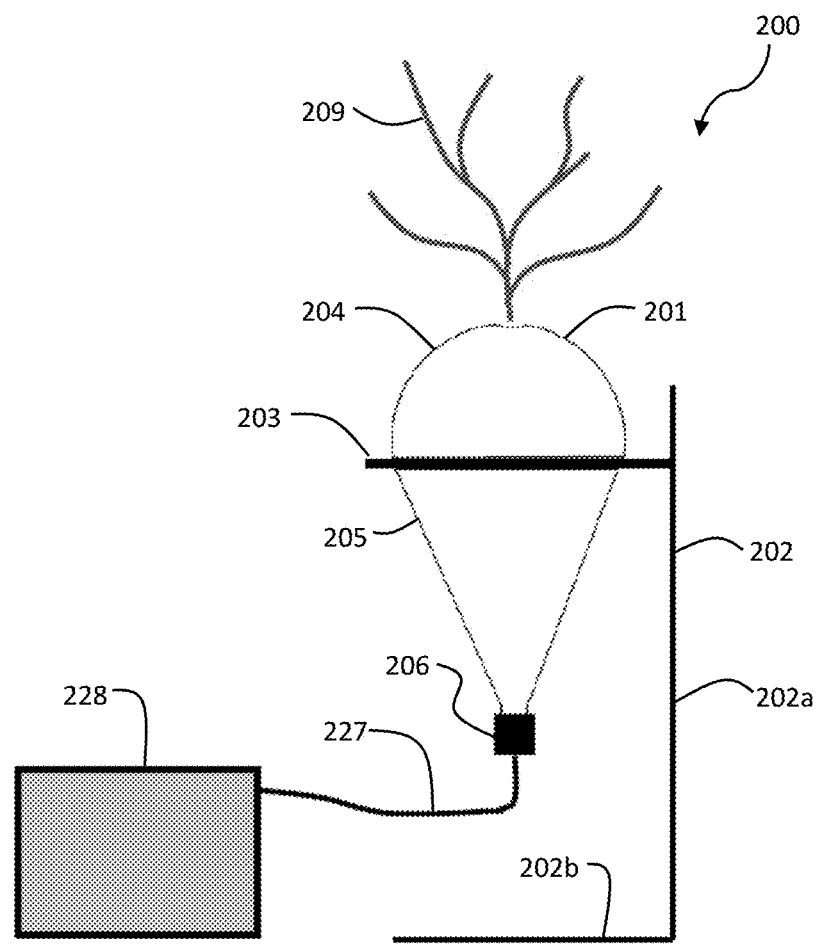
FIG. 8 is a view of a growing system for free-rooted plants according to some embodiments of the present invention.
Figure 13:
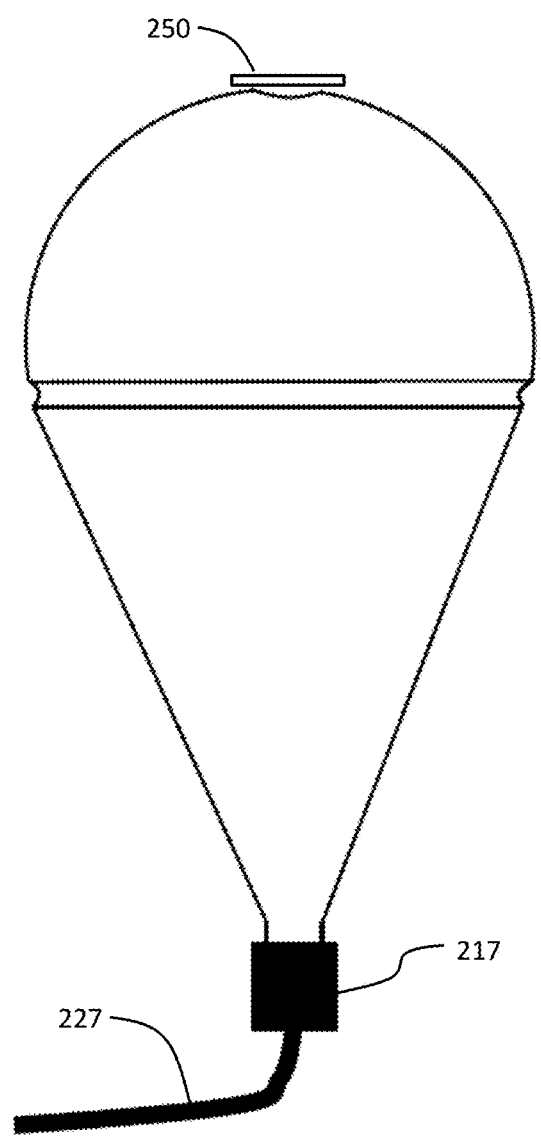
FIG. 13 is a view of a growing container with plug and hose according to some embodiments of the present invention.

In some embodiments of the present invention, as seen in FIG. 8, a growing system for free-rooted plants 200 includes a stand 202 which supports a growing container 201 for free-rooted plants. Further details of the stand 200 are discussed below with regard to FIG. 13. In some aspects, the growing system 200 allows for self-contained growing of an individual plant 209 in its own growing container 201. A water and nutrient subsystem 228 may be coupled to the growing container 201 with a tube or set of tubes 227. In some aspects, the growing container 201 may be suspended from hanging supports. In some aspects, the growing container 201 may reside in cutouts through a horizontal surface, such as a table top or bench. The growing container 201 allows for the growing of just a single plant, as desired.

Figure 9:
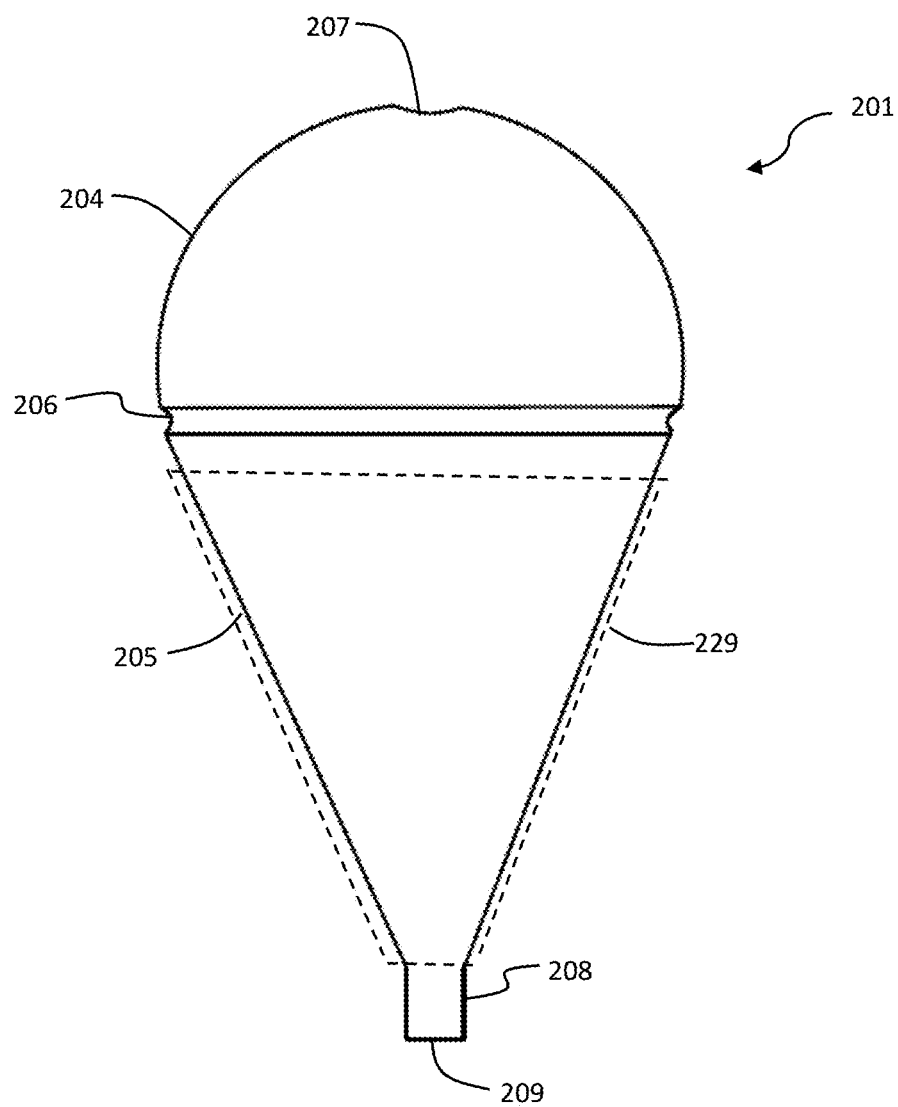
FIG. 9 is a view of a growing container according to some embodiments of the present invention.

In some aspects, and as further illustrated in FIG. 9, the growing container 201 may have an upper portion 204 and a lower portion 205. The upper portion 204 may be spherical in some aspects. The lower portion 205 may be conical in some aspects. The spherical upper portion 204 allows for volume maximization of the portion of the growing container which contains the roots of the growing plant. The conical bottom portion 205 allows for efficient drainage within the growing container of the excess water delivered into the growing container. In some aspects, the bottom portion may be of another profile which necks down.

Figure 11:
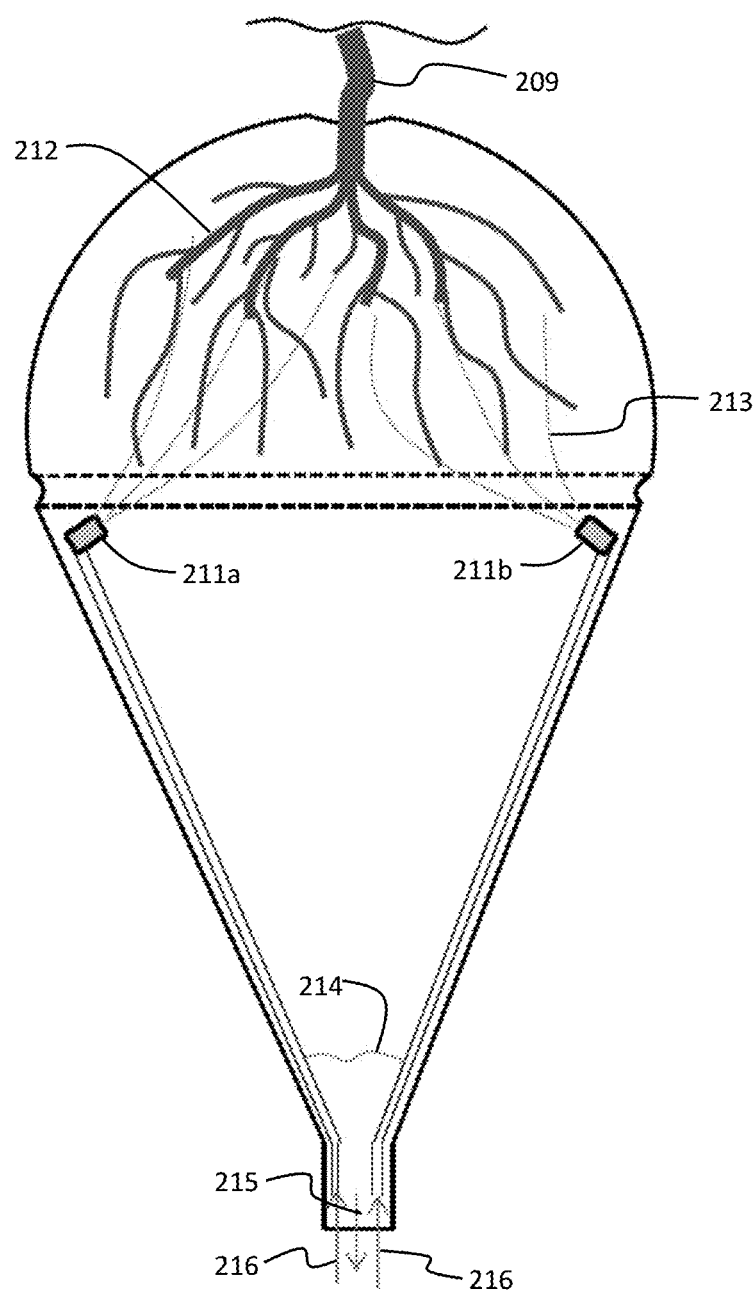
FIG. 11 is a cross-sectional view of a growing container with a plant according to some embodiments of the present invention.

The growing container 201 may have an upper opening 207 adapted to allow the plant to protrude from the growing container such that the stalks and leaves of the plant are above and exterior to the growing container, and the roots are within the growing container. A plant collar 250 may be used to support the plant so that the plant roots reside within the upper portion, but do not pull down the plant. The plant collar 250, as seen in FIG. 11, may be a flexible collar such as of neoprene or other strong, ductile material, through the center of which the plant stalk protrudes. The growing container 201 may have an exit tube 208 which defines a bottom opening 209 at a bottom end of the lower portion 205. A support recess 206 is adapted to allow the growing container 201 to be supported by an external support, as is described further below.

In an exemplary embodiment, the sphere diameter of the upper portion 204 is 9 inches. The sphere diameter may be in the range of 4-48 inches. The overall height of the growing container 201 may be 13 inches. The overall height may be in the range of 9-52 inches. The upper opening may be in the range of 1-3 inches. The bottom opening may be in the range of 1.5 inches and scalable to diameter and height variations.

In an exemplary use, the 9 inch spherical diameter growing container may grow plants that are 2 feet wide and 4 feet tall, or in the case of a vining plant, a plant that is 5 feet tall, for example. The use of such a small growing container for such a large plant provides efficiency of space, especially in contrast to plants grown traditionally in dirt. With the use of larger growing containers, similar increases in plant types that can be grown is seen.

In some aspects, the growing container 201 is made of two halves, which may be identical halves. The two halves may be 180 degree sweep portions of the axially symmetric growing container, such that the halves have vertical sides adapted to mate together. In some aspects, the halves are joined with a tongue in groove system in which a tongue on one vertical side is adapted to be retained in a groove on the other side. With each of the halves having a tongue on one vertical side, and a groove on the other vertical side, identical halves can be assembled together with the tongue side of one half snapping into the groove of the other half. In some aspects, the tongue and groove system is designed such that there is a locking aspect adapted to retain the halves together, while allowing the halves to be separated when desired. When using the growing container, it may be desired to trim the plant roots occasionally. The use of this two piece growing container allows for easy access to the roots of a grown plant for trimming. In an exemplary embodiment, the two halves of the growing container may be of plastic, and may be one quarter of an inch thick. Different thicknesses may be used depending on the structural requirements, which may depend upon plant size, and other factors.

In some aspects, the assembled growing container may have an outer skin 229, or jacket, which may form fit the exterior of the growing container. The jacket may have a zipper, or other fastening means, allowing the jacket to be placed around the growing container and then tightened around it. The jacket may provide further support to ensure that the two halves of the growing container do not detach when not desired. The jacket may also allow for ornamentation as desired by the user. Although illustrated in FIG. 7 as covering only the lower section of the growing container 201, it is to be understood that the jacket 229 may cover the entirety of the growing container other than the upper opening 207 and the bottom opening 209, or as desired by the user.

Figure 10:
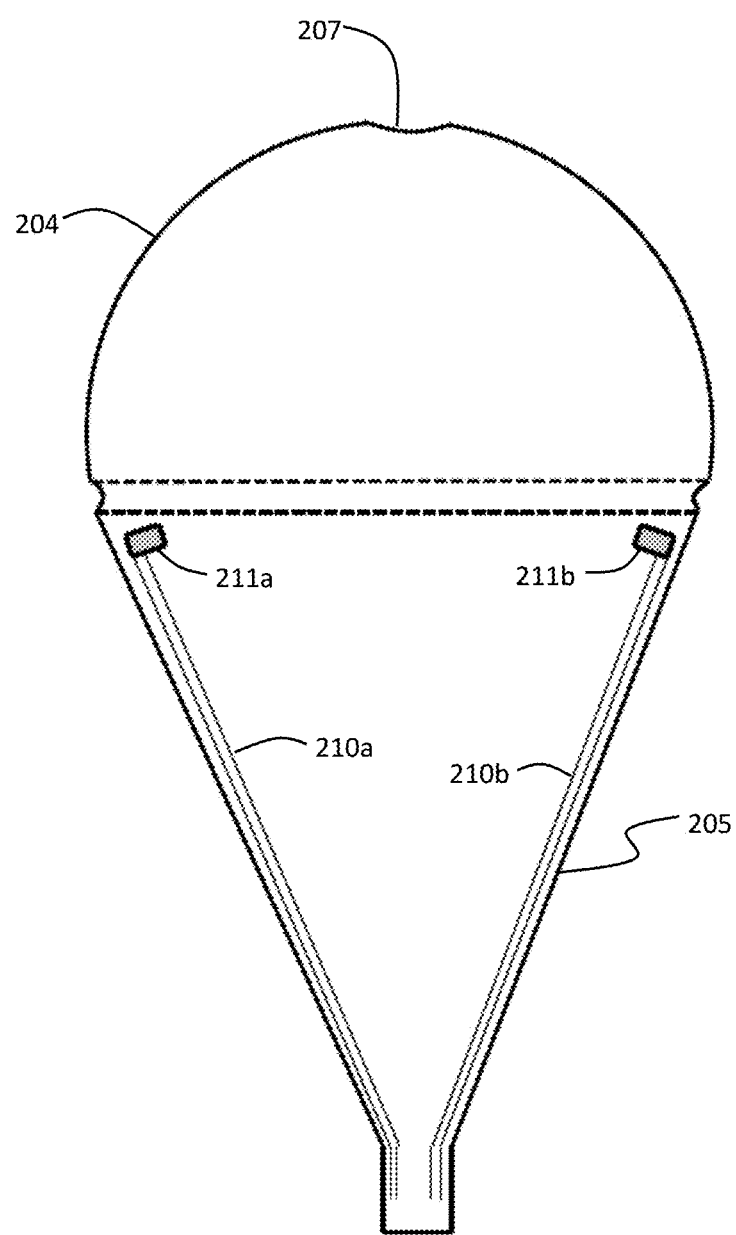
FIG. 10 is a cross-sectional view of a growing container according to some embodiments of the present invention.

In some embodiments of the present invention, as seen in cross-section in FIG. 10, a fluid transport system includes fluid inflow to the root system of the plant, and fluid outflow for excess moisture which would otherwise accumulate in the bottom of the growing container. Supply tubes 210a, 210b provide water to mister 211a, 211b, which are adapted to mist the roots of a free-rooted plant contained within the growing container. In some aspects, there may be a different number of paired supply tubes and misters. The supply tubes are routed down to the exit tube 208 where they will be coupled to a fluid supply source 228. In some aspects, the supply tubes line the exterior area of the exit tube 208 and the central area of the exit tube 208 couples to a drain for fluid outflow. In some aspects, the supply tubes route through the interior area of the exit tube 208 and the exterior area of the exit tube 208 couples to a drain for fluid outflow.

FIG. 11 illustrates an illustrative cross-section of the growing container 201 supporting a plant 209, with the roots 212 within the upper portion 204 of the growing container 201. In an exemplary use, water enters 216 into the supply tubes 210, routes upward within the lower portion of the growing container, and exits out through the misters 211, providing a mist of water 213 to the roots 212. Excess water drips down 214 to the bottom of the lower portion 205 of the growing container 201 and is able to flow out through an exit 215.

Figure 12:
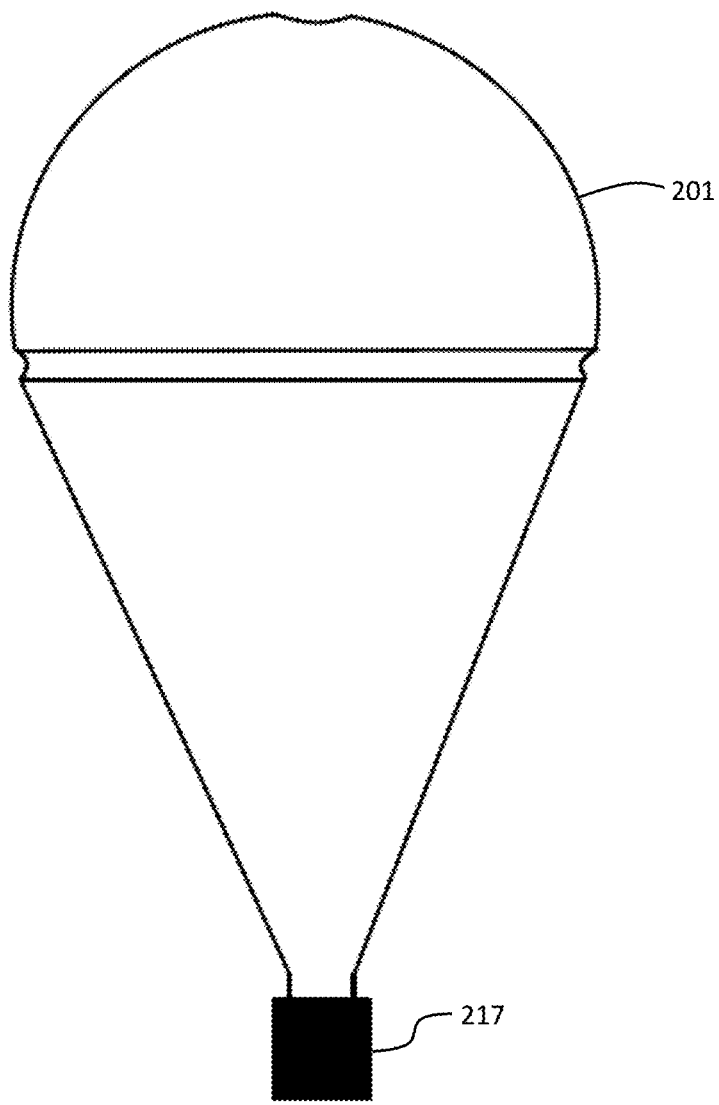
FIG. 12 is a view of a growing container with plug according to some embodiments of the present invention.
Figure 14A:
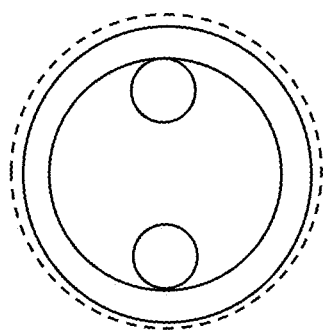
FIG. 14A is a top view of a plug and hose according to some embodiments of the present invention.
Figure 14B:
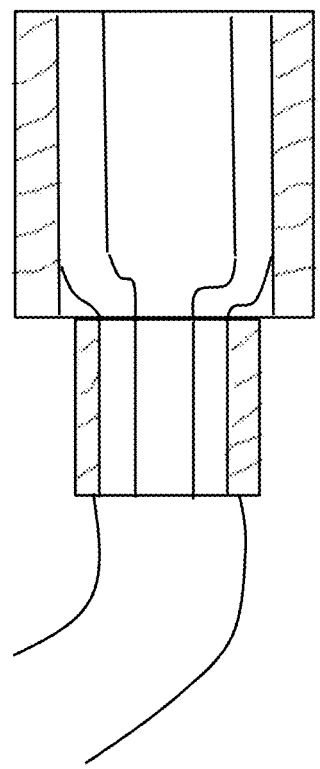
FIG. 14B is a cross-sectional view of a plug and hose according to some embodiments of the present invention.

FIG. 12 illustrates a bottom plug 217 which is adapted to seal the bottom opening 209 of the exit tube 208 of the growing container 201. FIG. 11 illustrates the bottom plug 217 coupled to a hose 227 which is adapted to provide water into the supply tubes 210 and remove excess water from the growing container. FIGS. 14A and 14B illustrate an exemplary embodiment of the bottom plug 217. In some aspects, the bottom plug may thread internally to the inside surface of the bottom of the growing container. A threaded portion 240 may reside outside of the outer surface 241 of the bottom plug and thread to a mating interface within the bottom of the lower portion of the growing container. Within the inner surface 242 of the bottom plug, supply inlets 243a, 243b, are adapted to route water, or water and nutrients, from the fluid supply hose 227 and up to the misters. The remaining area within the inside of the plug may function as a drain area 245. In some aspects, as seen in FIG. 11, the bottom plug 217 may capture the outer surface of the bottom of the lower portion of the growing container.

Figure 15:
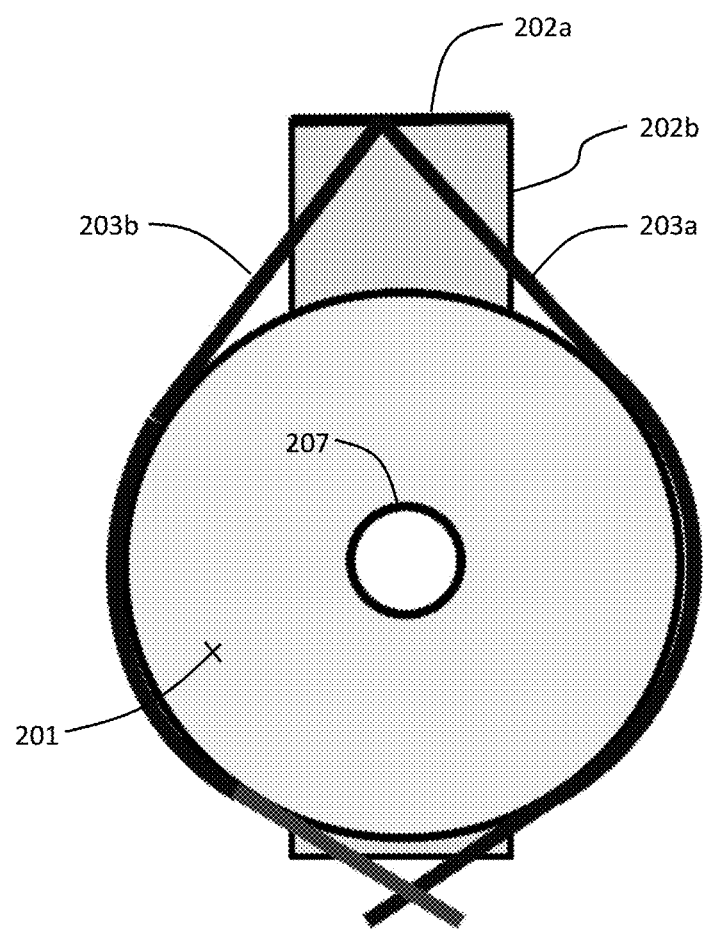
FIG. 15 is a top view of a growing container on a stand according to some embodiments of the present invention.

FIG. 15 illustrates a top view of the stand 202 supporting the growing container 201. A bottom plate 202b is coupled to a vertical support 202a from which support arms 203a, 203b extend out to grasp and support the growing container 201. In some aspects, the support arms are spring loaded such that they may be separated from each other enough to allow for placement of the growing container between them. The support arms then close upon the recess in the growing container and support the growing container.

In some aspects, the water and nutrient subsystem 208 is adapted to provide water to the growing container on a regular schedule. In some aspects, the water and nutrient subsystem has an electronic control system which may be programmed to provide water on a desired schedule. In some aspects, a single water and nutrient subsystem may be used with a plurality of growing containers. In an exemplary embodiment, the water and nutrient subsystem includes a fluid supply source 228 which is coupled to the growing container 200 which a supply line 227. The fluid supply source may include a pump adapted to pump water, or water and nutrients, at a pressure in the range of 125-150 psi. The pump may provide water in a range of 60-500 psi. The fluid supply source 228 may also include a timing system adapted to provide water on a timed schedule, depending upon the needs of the plant or plants supplied. In an exemplary embodiment, the pump may supply water for durations of between 10 seconds to 5 minutes, and then be off for a duration of between 10 seconds to 10 minutes. The water flow volume rate for a 9 inch spherical diameter container may be ½ gallon per hour. In some aspects, the fluid supplied is water. In some aspects, the fluid supplied is water with nutrients in the range of 1-900 ppm.

In some aspects, a single fluid supply source 228 may be adapted to supply more than a single growing container. For example, a single fluid supply source may provide water, or water and nutrients, to two (or more) growing containers. Each growing container would have its own supply line, and may have its own timing circuit.

The water and nutrient subsystem may also receive back water drained from the growing container, which may be stored in a fluid reservoir. In some aspects, the drained water may be analyzed to determine what level of nutrients remain in the returned water, in order to assess what level of nutrients are required to return the drained water into a condition appropriate for re-use, to be returned to the growing container. In some aspects, the drained water may be routed to another purpose.

Figure 16:
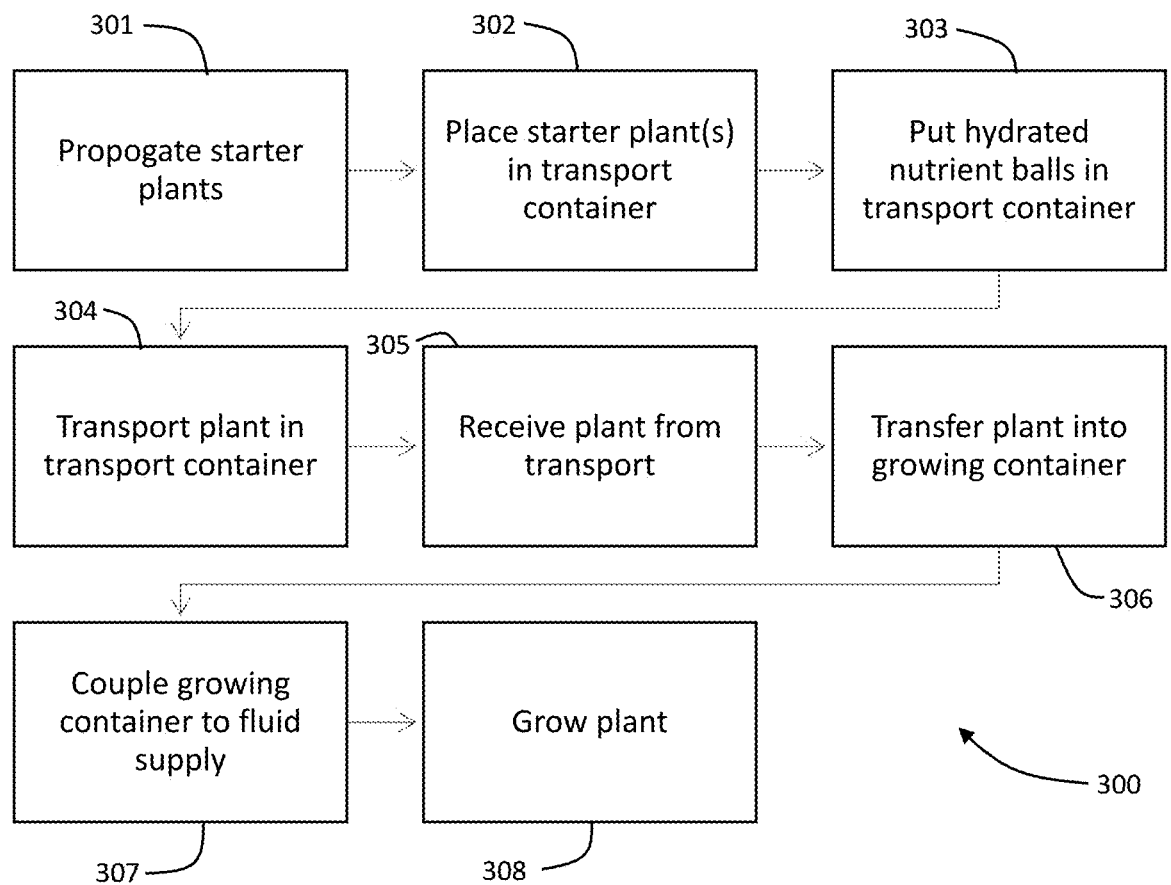
FIG. 16 illustrates a method for the growing of free-rooted plants according to some embodiments of the present invention.

In some embodiments of the present invention, as seen in FIG. 16, a method 300 for the propagating, transporting, and growing of free-rooted plants. Starter plants may be propagated 301 using techniques known in the art, which can include cloning of free-rooted, aeroponically grown, plants. These plants may then be placed 302 into a transport container. The transport container may be adapted to support and transport a free-rooted plant, and include a light, as discussed above. Hydrated nutrient balls may be then placed into the transport container 303, and are adapted to provide water and nutrients to the plant during transport. The plant may then be transported 304 in the transport container. The transport may include transport through the mail, using other courier types, or through other methods. The plant is then received 305. After reception, the plant may then be transferred 306 to a growing container. The growing container may include a spherical upper portion and a conical lower portion. The growing container allows for the growing of individual free-rooted plants and is coupled to a fluid supply system which provides water to misters within the growing container. In some aspects, the plant may be immediately transferred into the growing container. In some aspects, as discussed above, the plant may reside in the transport container for days or weeks. Once the plant has been transferred into the growing container, the growing container may be coupled to a fluid supply system 307, which has been discussed above. The user in then able to grow the plant 308.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A method for the transport and growing of aeroponically grown plants, said method comprising the steps of:
   placing a single aeroponically grown starter plant in a single plant transport container, said single plant transport container comprising a battery powered transport container light and a battery, said single starter plant comprising roots, one or more stalks, and leaves;
   hydrating a plurality of hydratable nutrient balls;
   placing the hydrated hydratable nutrient balls in said single plant transport container after said step of hydrating the hydratable nutrient balls to temporarily provide moisture and nutrients to the plant during shipping;
   switching on the transport container light;

placing the single plant transport container into a shipping box;
sealing the shipping box;
shipping the plant in the single plant transport container;
receiving the plant after the step of shipping the plant in the single plant transport container;
removing the plant from the transport container;
transferring the plant to a growing container without the hydratable nutrient balls; and
growing the plant aeroponically in said growing container.

2. The method of claim 1 wherein said single plant transport container comprises:
a base container;
a plurality of pillars coupled to said base container on a first end of said pillars;
a top, said top coupled to a second end of said pillars;
a stem and root stabilizer, said stem and root stabilizer coupled to a top of said base container, said stem and root stabilizer comprising a central hole adapted to allow for the stabilizing of a single plant,
wherein said transport container light is coupled to said top, said transport container light configured to illuminate downward along said pillars and towards said base container.

3. The method of claim 2 wherein said hydrated hydratable nutrient balls have been hydrated with water and nutrients, and wherein said nutrients comprise one or more from the group of nitrogen, phosphorous, potassium, calcium, magnesium, simple carbohydrates, rhizome, and mycorrhiza.

4. The method of claim 2 wherein said transport container light comprises a light emitting diode with a wavelength of light only in the range of 400-600 nm.

5. The method of claim 1 wherein said growing container comprises:
a spherical upper portion, said spherical upper portion comprising an upper portion of a sphere and a hole at a top of said spherical upper portion;
a conical lower portion, wherein said spherical upper portion and said conical lower portion enclose the roots of the plant in said growing container and wherein the plant protrudes from the growing container through the hole at the top of the spherical upper portion wherein the stalks and leaves of the plant are above and exterior to the growing container;
a hole at a lower end of said conical lower portion.

6. The method of claim 5 wherein said growing container further comprises:
one or more supply tubes routed from said hole in said lower conical portion upwards along an inside of said lower portion; and
one or more misters coupled to each of said one or more supply tubes.

7. The method of claim 6 wherein said transport container comprises:
a base container;
a plurality of pillars coupled to said base container on a first end of said pillars,
a top, said top coupled to a second end of said pillars; and
a stem and root stabilizer, said stem and root stabilizer coupled to a top of said base container, said stem and root stabilizer comprising a central hole adapted to allow for the stabilizing of a single plant,
wherein said transport container light is coupled to said top, said transport container light configured to illuminate downward along said pillars and towards said base container.

8. The method of claim 7 wherein said transport container light comprises a light emitting diode with a wavelength of light only in the range of 400-600 nm.

9. The method of claim 7 further comprising a step of coupling the growing container to a fluid supply system.

10. The method of claim 9 wherein said fluid supply system comprises:
a fluid pump; and
timing system adapted to energize said fluid pump.

11. The method of claim 10 wherein said fluid supply system comprises a timing control system for the timed pumping of water, and wherein said method further comprises a step of programming said timing control system for the time pumping of water.

12. The method of claim 1 wherein said hydrated hydratable nutrient balls have been hydrated with water and nutrients, and wherein said nutrients comprise one or more from the group of nitrogen, phosphorous, potassium, calcium, magnesium, simple carbohydrates, rhizome, and mycorrhiza.

13. The method of claim 1 further comprising a step of coupling the growing container to a fluid supply system.

14. The method of claim 13 wherein said fluid supply system comprises:
a fluid pump; and
timing system adapted to energize said fluid pump.

15. The method of claim 14 wherein said fluid supply system comprises a timing control system for the timed pumping of water, and wherein said method further comprises a step of programming said timing control system for the timed pumping of water.

* * * * *